(No Model.) 2 Sheets—Sheet 1.

J. J. WALLACE.
TRACE BUCKLE.

No. 373,209. Patented Nov. 15, 1887.

ATTEST
H. W. Waggoner.
C. C. Clark.

INVENTOR
J. J. Wallace
By L. P. Graham
Attorney (No Model.) 2 Sheets—Sheet 2.
J. J. WALLACE.
TRACE BUCKLE.
No. 373,209. Patented Nov. 15, 1887.
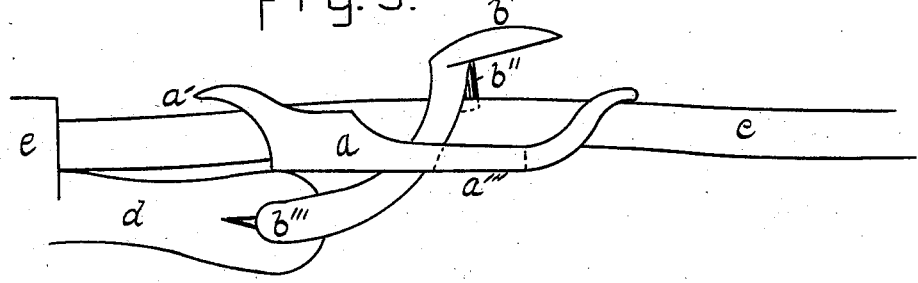
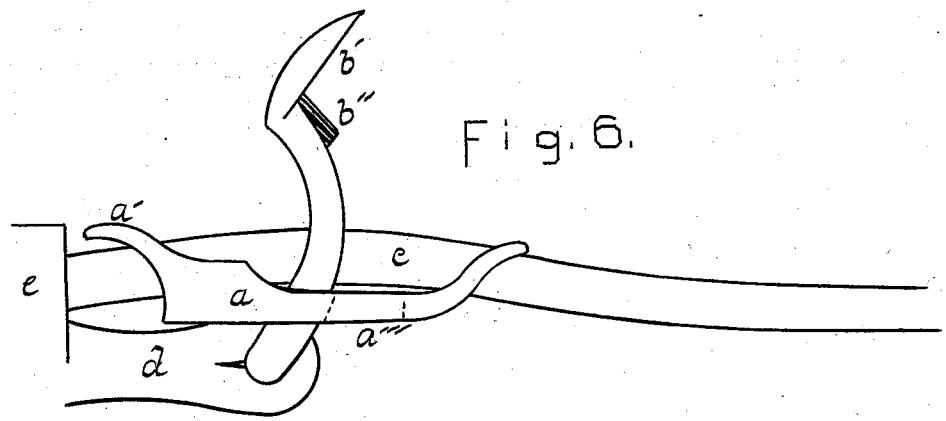
ATTEST
J. N. Bills.
J. D. Walker
INVENTOR
John J. Wallace
By L. P. Graham
his attorney
in fact.

UNITED STATES PATENT OFFICE.

JOHN J. WALLACE, OF MOUNT ZION, ILLINOIS.

TRACE-BUCKLE.

SPECIFICATION forming part of Letters Patent No. 373,209, dated November 15, 1887.

Application filed October 28, 1886. Serial No. 217,402. (No model.)

*To all whom it may concern:*

Be it known that I, JOHN J. WALLACE, of the town of Mount Zion, county of Macon, and State of Illinois, have invented certain new and useful Improvements in Trace-Buckles, of which the following is a specification.

My invention consists in certain details of construction and combinations of parts, as hereinafter set forth and claimed, whereby a buckle of simplicity, durability, and extreme facility of operation may be produced.

Figure 1:
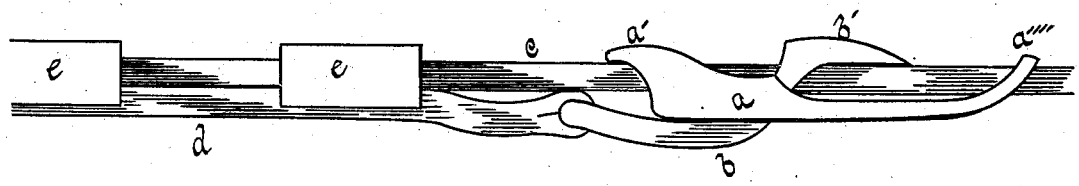
Figure 2:
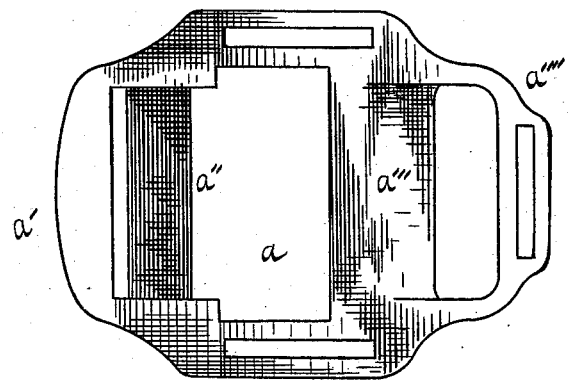
Figure 3:
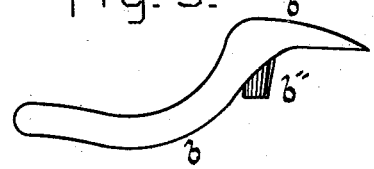
Figure 4:
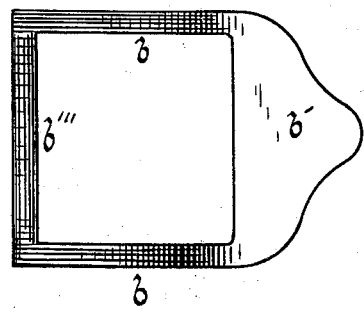

In the drawings accompanying and forming a part of this specification, Figure 1 is a side view of the entire buckle in position on the trace. Fig. 2 is a face view of the sliding frame. Fig. 3 is a side view of the bail. Fig. 4 is a face view of the bail, and Figs. 5 and 6 represent details of operation.

$a$ is a sliding frame that co-operates with the bail both to make the fastening thereof permanent under ordinary stress and to readily unfasten the same whenever it is necessary to lengthen or shorten the trace.

$a'$ is a bar of the sliding frame that crosses the trace on the outer surface thereof. $a''$ is a bar of the frame that crosses the trace on the inner surface thereof. $a'''$ is a bar that crosses the trace on the inner surface thereof. $a''''$ is a bar that crosses the trace on the outer surface thereof. Bail $b$ has a plate, $b'$, provided with rigid inwardly-projecting tongue $b''$, and has also a bar, $b'''$, to which the short trace is secured.

$c$ is the long trace, provided with the customary holes for the buckle-tongue.

$d$ is the short trace, having loops $e\ e$.

Loops for the back, belly, and hip straps may be formed on the frame, as shown in Fig. 2, or in any suitable manner.

The bail passes through the frame between the bars $a''$ and $a'''$, and the long trace passes between the plate $b'$ of the bail and bars $a''$ and $a'''$ of the frame. When there is a draft-strain on the trace, the bar $a''$ acts as a fulcrum to force the tongue-bearing plate in close contact with the trace, and so prevent the detachment of the tongue.

When it is desired to shift the buckle on the long trace, the frame $a$ is slid forward or to the left, as shown in the drawings, the first effect being to force the front portion of the bail from the long trace by the interposition of bar $a''$, as shown in Fig. 5, and the second effect being to carry the tongue end of the bail clear of the trace by bar $a'''$ of the frame acting on the inclined side bars of the bail, as shown in Fig. 6. From this it will be seen that the essential parts of the frame are the bars $a''$ and $a'''$, and that the bars $a'$ and $a''''$ are of utility only as providing means for securing the frame to the trace.

I claim as new and desire to secure by Letters Patent—

The trace-buckle comprising the bail $b$, having tongue $b''$, of a length corresponding to the thickness of the trace, and the frame $a$, having cross-bars $a''$ and $a'''$ and adapted to slide longitudinally on the trace and over the end of the tongue while embracing the bail, as and for the purpose set forth.

In testimony whereof I sign my name in the presence of two subscribing witnesses.

JOHN J. WALLACE.

Witnesses:
 JOHN R. WONACOTT,
 GEORGE W. HARRIS.